United States Patent [19]

Hitomi et al.

[11] Patent Number: 4,592,310
[45] Date of Patent: Jun. 3, 1986

[54] INTAKE DEVICE FOR INTERNAL COMBUSTION ENGINE

[75] Inventors: Mitsuo Hitomi; Junzo Sasaki; Kazuhiko Ueda, all of Hiroshima, Japan

[73] Assignee: Mazda Motor Corporation, Japan

[21] Appl. No.: 693,299

[22] Filed: Jan. 22, 1985

[30] Foreign Application Priority Data

Jan. 26, 1984 [JP] Japan ............................ 59-12659
Jan. 26, 1984 [JP] Japan ............................ 59-12660

[51] Int. Cl.$^4$ ............................................ F02B 75/18
[52] U.S. Cl. ............................. 123/52 M; 123/432; 123/90.15; 123/90.17; 123/190 A
[58] Field of Search ............... 123/432, 90.15, 90.16, 123/190 A, 52 M

[56] References Cited

U.S. PATENT DOCUMENTS 2,835,235  5/1958  Gassmann ............. 123/52 M
3,897,760  8/1975  Hisserich ............ 123/90.16
4,438,737  3/1984  Burandt ............. 123/90.17

FOREIGN PATENT DOCUMENTS 48-58214   8/1973  Japan .
56-115819  9/1981  Japan .
58-119919  7/1983  Japan .

Primary Examiner—E. Rollins Cross
Attorney, Agent, or Firm—Gerald J. Ferguson, Jr.

[57] ABSTRACT

An intake device for an internal combustion engine is provided with an intake passage-length change mechanism for changing the effective length of the intake passage for each cylinder, and a valve timing change mechanism for changing the closure timing of the intake valve for each cylinder. The intake passage-length change mechanism is actuated, in a particular engine speed range, to change the effective length of the intake passage according to the engine speed so that the natural frequency of the intake system is tuned with the frequency of the pressure change in the intake passage which is determined by the engine speed, thereby enhancing the intake inertia effect to improve the engine output power. In the particular engine speed range, the valve timing change mechanism is actuated to make better use of the inertia effect enhanced by the intake passage-length change mechanism. Outside the particular engine speed range, the valve timing change mechanism is actuated to change the intake valve closure timing so that the volumetric efficiency is improved according to the engine speed.

17 Claims, 8 Drawing Figures

INTAKE DEVICE FOR INTERNAL COMBUSTION ENGINE

BACKGROUND OF THE INVENTION

1. Field of the Invention

This invention relates to an intake device for an internal combustion engine, and more particularly to an intake device for an internal combustion engine in which the air-column vibration of the intake system is synchronized with the intake period to obtain so-called intake inertia supercharging effect, thereby improving the engine output power.

2. Description of the Prior Art

In the internal combustion engine, as the piston moves up and down in the cylinder, a pressure wave is created in the intake passage and transmits through the intake passage up to the surge tank, where it is reflected and then returns to the cylinder. This is repeated and accordingly results in periodical pressure change in the intake passage at a frequency determined by the such operating condition of the engine as the engine speed. On the other hand, every engine intake system has its natural frequency determined by the volume of the intake passage and the cylinder. It is known that the volumetric efficiency is improved by virtue of the intake inertia effect and that the engine output power can be enhanced by tuning the two frequencies with each other.

More particularly, the natural frequency of the intake system is determined by the length and cross-sectional area of the intake passage and the average volume of the cylinder during the intake period. In order to enlarge the engine speed range over which the pressure change frequency can be tuned with the natural frequency of the intake system and to widen the engine speed range over which the engine output power can be enhanced by virtue of the intake inertia effect, it has been proposed to make the effective length or the effective cross-sectional area of the intake passage according to the engine speed. See Japanese Unexamined Patent Publication Nos. 48(1973)-58214, 56(1981)-115819 and 58(1983)-119919, for example.

However, in accordance with the prior art, the engine speed range over which the engine output power can be enhanced by virtue of the intake inertia effect cannot be sufficiently widened and comparatively complicated and large equipment is required to change the effective length of the intake passage by a sufficient amount. That is, practically, the effective length of the intake passage can be changed only by a limited amount and therefore said engine speed range over which the engine output power can be enhanced by virtue of the inertia effect cannot be sufficiently widened by only changing the effective length of the intake passage. Further, even in the engine speed range in which the effective length of the intake passage can be practically changed to tune said two frequencies with each other, an optimal intake inertia effect cannot be obtained unless the intake valve timing is suitable.

SUMMARY OF THE INVENTION

In view of the foregoing observations and description, the primary object of the present invention is to provide an improved intake device for an internal combustion engine which is capable of making optimum use of the intake inertia effect to enhance the engine output power over a wider engine speed range.

Another object of the present invention is to provide an improved intake device for an internal combustion engine in which optimum intake inertia effect can be obtained substantially over the entire engine speed range in which the effective length of the intake passage can be practically changed to tune the frequency of the periodical pressure change in the intake passage or the frequency of the air-column vibration with the natural frequency of the intake passage.

Still another object of the present invention is to provide an improved intake device for an internal combustion engine which is capable of accomplishing said objects without complicating the structure and without substantially adding to the overall size of the intake system.

The intake device for an internal combustion engine in accordance with the present invention comprises intake passage-length change means for changing the effective length of the intake device for each cylinder, valve timing change means for changing at least the closure timing of the intake valve for each cylinder and control means for controlling the intake passage-length change means and the valve timing change means in response to each other according to the operating condition of the engine.

DESCRIPTION OF THE PREFERRED EMBODIMENT

Figure 1:
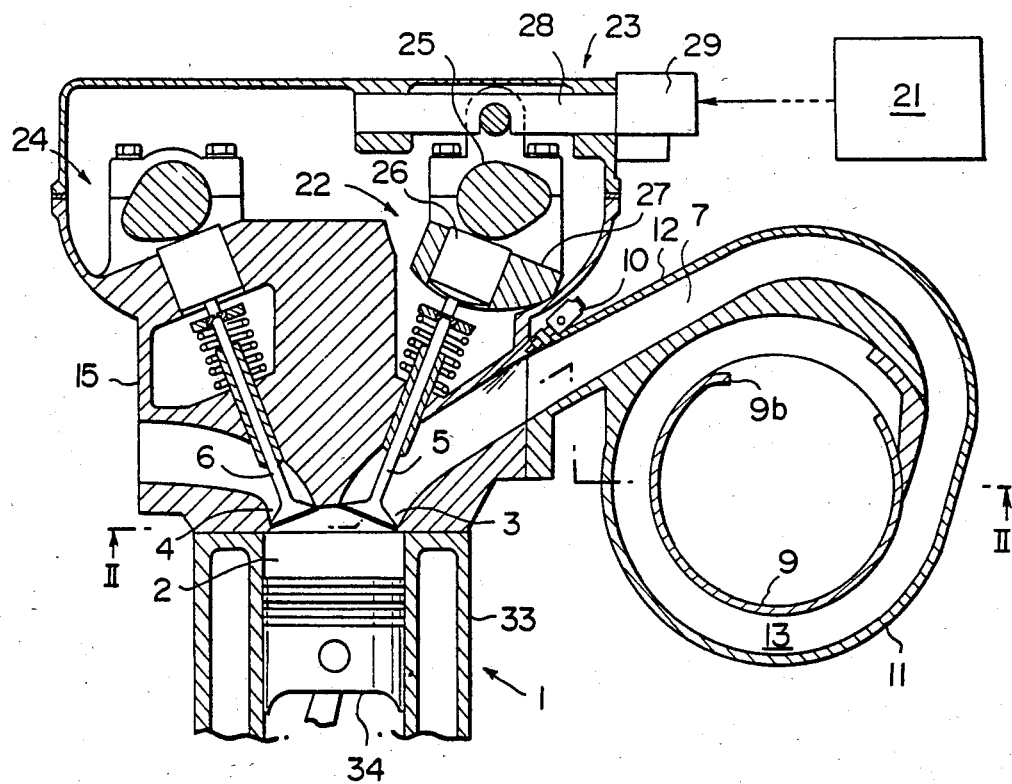
FIG. 1 is a fragmentary cross-sectional view showing a multiple-cylinder engine employing an intake device in accordance with an embodiment of the present invention.
Figure 2:
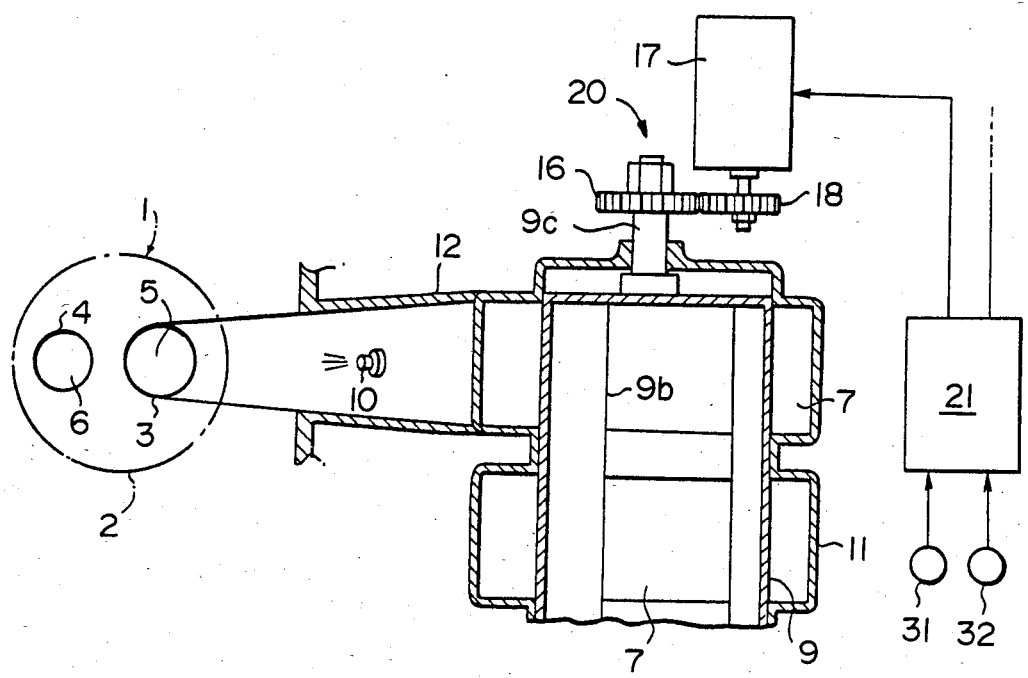
FIG. 2 is a fragmentary cross-sectional view taken along line II—II in FIG. 1.
Figure 2:
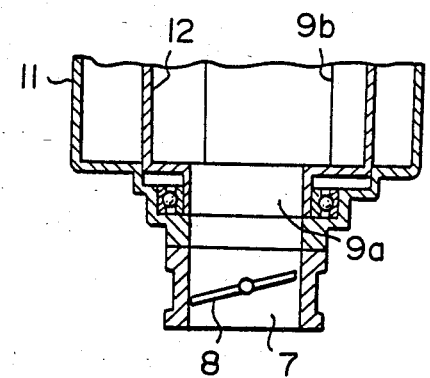

FIGS. 1 and 2 show a multiple-cylinder engine employing an intake device in accordance with an embodiment of the present invention. Each combustion chamber 2 of the engine 1 is provided with an intake port 3 and an exhaust port 4. An intake valve 5 is disposed in each intake port 3 to open and close it and an exhaust valve 6 is disposed in each exhaust port 4 to open and close it. Each intake port 3 is communicated with the atmosphere by an intake passage 7 which includes a surge tank 9 disposed downstream of a throttle valve 8 and a discrete intake pipe 12 which branches off from the surge tank 9. A fuel injection nozzle 10 is disposed in each intake pipe 12.

The surge tank 9 is in the form of a hollow cylinder mounted for rotation in a casing 11 to extend in the longitudinal direction thereof. The surge tank 9 has an open end 9a and the internal space of the surge tank 9 is communicated with the atmosphere by way of the open end 9a and the throttle valve 8. The surge tank 9 is provided, in the peripheral surface thereof, with communicating holes 9b which communicate the internal space of the surge tank 9 with the intake pipes 12 for the respective combustion chambers 2. As can be understood from FIG. 1, intake air is introduced into each combustion chamber 2 through the open end 9a of the surge tank 9, the internal space of the same, the communicating hole 9b of the same, the space 13 between the outer peripheral surface of the surge tank 9 and the inner surface of the casing 11 and the discrete intake pipe 12. Accordingly, the distance by which intake air must travel after passing through each communicating hole 9b before flowing into each combustion chamber 2 can be changed by rotating the surge tank 9 about its longitudinal axis, i.e., the effective length of each intake passage 7 can be changed by rotating the surge tank 9.

The surge tank 9 is driven by a driving mechanism 20 to change the effective length of the intake passage 7. The driving mechanism 20 is mounted on the end face of the casing 11 remote from the open end 9a of the surge tank 9, and comprises an input gear 16 fixedly mounted on a shaft 9c which is formed integrally with the surge tank 9 and projects outside of the casing 11 through said end face of the casing 11, an electric motor 17 and a gear 18 which is fixed to the output shaft of the motor 17 and in mesh with the input gear 16. The motor 17 is driven under the control of a control signal from a control means (control unit) 21.

In the cylinder head 15 of the engine 1 are provided an intake valve driving mechanism 22 for opening and closing the intake valves 5 and an exhaust valve driving mechanism 24 for opening and closing the exhaust valves 6. The intake valve driving mechanism 22 is provided with a valve timing change mechanism 23 for changing the intake-valve timing.

The intake valve driving mechanism 22 includes a camshaft 25 which is rotated by a crankshaft (not shown) of the engine 1 and the intake valves 5 are opened and closed in response to rotation of the camshaft 25 by way of tappets 26. The tappets 26 are slidably held in a pivoted member 27 which is supported on the camshaft 25 so that the pivoted member 27 and the camshaft 25 can be mutually rotated with respect to each other and is provided with an arcuate lower surface. An actuator 29 is arranged to swing, by way of a rod 28, the pivoted member 27 about the rotational axis of the camshaft 25 according to the operating condition of the engine. Said valve timing change mechanism 23 is thus formed. The actuator 29 of the valve timing change mechanism 23 is also controlled by a control signal from the control means 21.

Figure 3:
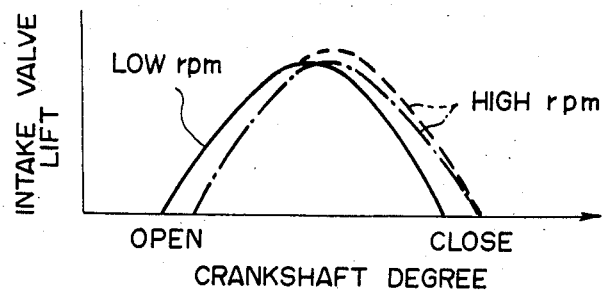
FIG. 3 is a view for illustrating control of the intake valve timing accomplished by the valve timing change mechanism in the intake device of FIGS. 1 and 2.

When the rod 28 is moved rightward in FIG. 1 by the actuator 29, the pivoted member 27 is swung in the rotational direction of the camshaft 25 (clockwise direction in FIG. 1), and the tappets 26 are moved together with the pivoted member 27, whereby the contacting point between the cam surface of the camshaft 25 and the upper surface of each tappet 26 for a given angular position of the camshaft 25 is moved so that the intake-valve timing is retarded. In this particular embodiment, both the valve opening timing and the valve closure timing of the intake valves 5 are retarded as the engine speed is increased as represented by the chained line in FIG. 3, the intake-valve timing during low speed operation of the engine being represented by the solid line in FIG. 3. Instead, however, only the valve closure timing may be retarded without changing the valve opening timing as the engine speed in increased, as represented by the dotted line in FIG. 3.

To the control means 21 are inputted an engine rpm signal from an engine speed sensor 31 and a load signal from a load sensor 32, and the control means 21 controls the effective length of the intake passages 7 and the valve closure timing of the intake valves 5 according to the engine speed at least during heavy load operation of the engine so that maximum intake air inertia effect can be obtained.

Reference numerals 33 and 34 in FIG. 1 respectively denote a cylinder block and a piston.

Figure 4:
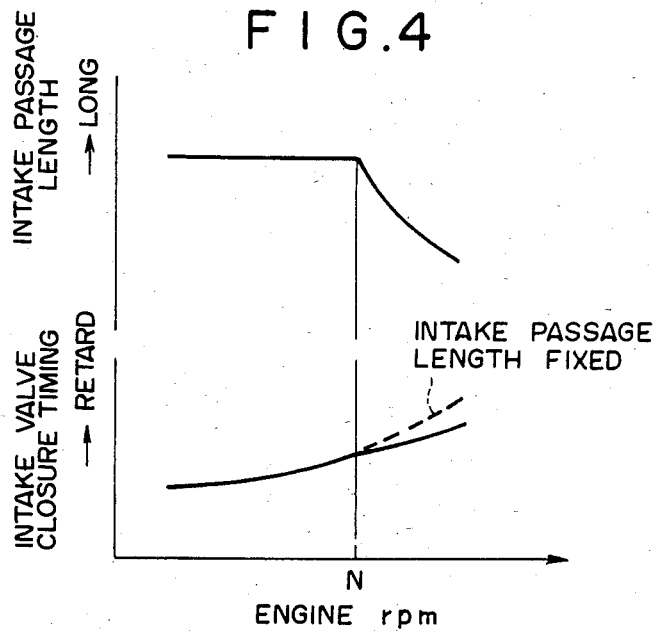
FIG. 4 is a view for illustrating control of the effective length of each intake passage and of the intake valve closure timing with respect to each other accomplished in the intake device.

The control means 21 controls the effective length of the intake passages 7 (which can be changed by rotating the surge tank 9 as described above) and the valve closure timing to the intake valves 5 as shown in FIG. 4.

Basically, the control means 21 elongates the effective length of the intake passages 7 during low speed operation of the engine and shortens the same when the engine speed is increased to a high speed. That is, when the engine speed reaches a predetermined speed N which is relatively high, the control means 21 actuates the driving mechanism 20 to shorten the effective length of the intake passages 7 as the engine speed increases.

Basically, the control means 21 retards the valve closure timing of the intake valves 5 as the engine speed increases. The amount by which the intake valve closure timing is retarded is made smaller after the engine speed exceeds the predetermined speed N than that by which the intake valve closure timing should be retarded if the effective length of the intake passages 7 were not changed, the intake valve closure timing with respect to the engine speed when the effective length of the intake passages is kept constant being represented by the dotted line in FIG. 4. When the engine speed N is lower than the predetermined speed N, the intake valves 5 are closed earlier as the engine speed lowers so that blow-back of intake air does not occur. When the engine speed exceeds the predetermined speed N, the intake valve closure timing is selected to make the best use of increase in pressure due to the tuning of the frequency of the engine vibration and the natural frequency of the intake system realized by shortening the effective length of the intake passages.

Figure 5:
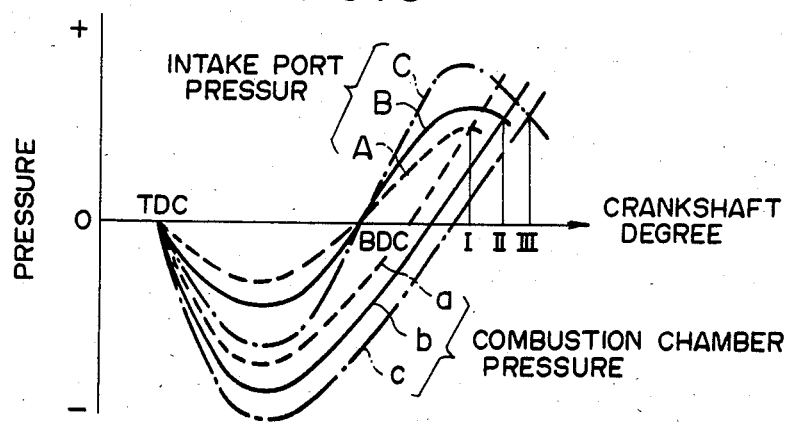
FIG. 5 is a view for illustrating the intake valve closure timing suitable for obtaining an optimal intake inertia effect for a given engine speed region.

The intake valve opening timing is set based upon the characteristics shown in FIG. 5. In order to obtain maximum intake air inertia effect, basically, each intake valve 5 should be closed at the moment the pressure in the intake port 3 immediately upstream of the intake valve 5 and the pressure in the combustion chamber 2 coincide with each other since if the intake valve 5 remains open thereafter, the former pressure becomes lower than the latter pressure and accordingly intake gas blows back from the combustion chamber 2. The amplitude of the intake port pressure is increased as the engine speed increases by virtue of said tuning of the frequency of the engine vibration and the natural frequency of the intake system realized by changing the effective length of the intake passages as can be understood from FIG. 5 in which pulsations in the intake port pressure when the engine speed is low, intermediate and high are represented by the dotted line A, the solid line B and the chained line C, respectively. The minimum pressure of the combustion chamber pressure (which is negative) is lowered as the engine speed increases as can be understood from FIG. 5 in which pulsations in the combustion chamber pressure when the engine speed is low, intermediate and high are represented by the dotted line a, the solid line b and the chained line c, respectively. Further, the combustion chamber pressure rises after the piston 34 begins to move upward with a delay which is increased as the engine speed increases. Accordingly, the time at which the intake valve 5 should be closed for a given engine speed region, i.e., the time at which the intake port pressure and the combustion chamber pressure coincide with each other for a given engine speed, shifts toward the retarding side as the engine speed icreases, I, II and III in FIG. 5 representing the crankshaft degree at which the intake valve 5 should be closed when the engine speed is low, intermediate and high, respectively.

By thus changing both the effective length of the intake passages 7 and the intake valve timing, maximum intake inertia effect can be obtained. By changing only the intake valve timing, such a large pressure amplitude could not be obtained over the entire operating region of the engine. On the other hand, if only the effective length of the intake passages is changed, blow-back of intake gas could occur or the intake valves 5 could be closed before the intake is completed.

Figure 6:
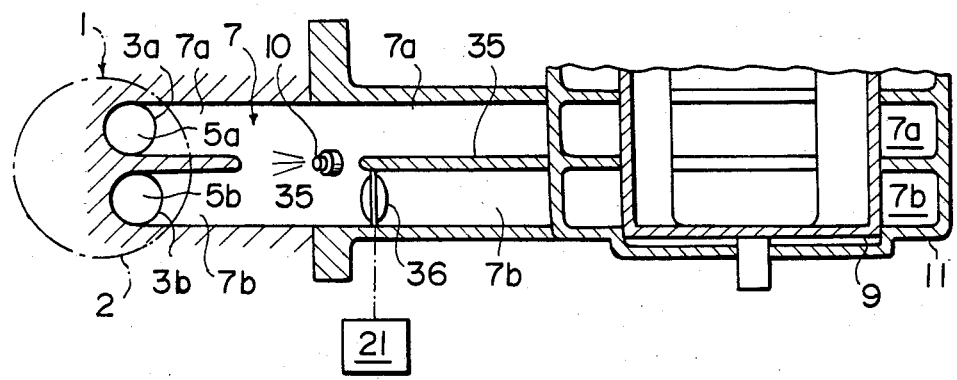
FIG. 6 is a fragmentary cross-sectional view showing multiple-cylinder engine employing an intake device in accordance with another embodiment of the present invention.
Figure 7:
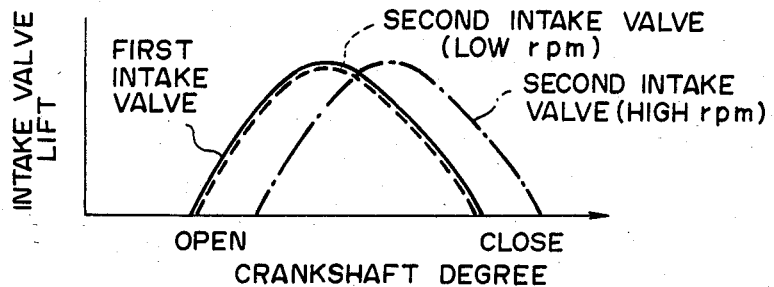
FIG. 7 is a view for illustrating control of the intake valve timing accomplished by the valve timing change mechanism in the intake device of FIG. 6.

FIG. 6 is a fragmentary cross-sectional view of a multiple-cylinder engine employing an intake device in accordance with another embodiment of the present invention. This embodiment is similar to the embodiment described above except that each intake passage 7 is divided into two passages near the combustion chamber and that control of the effective length of the intake passage and the intake valve timing differs from that of the embodiment described above. In this embodiment, each combustion chamber 2 of the engine 1 is provided with first and second intake ports 3a and 3b, the first intake ports 3a being for light load operation and the second intake port 3b being for heavy load operation. The first and second intake ports 3a and 3b are respectively provided with first and second intake valves 5a and 5b. The valve timing of the first intake valve 5a is fixed while that of the second intake valve 5b is variable. That is, the overall opening time of the intake port for each combustion chamber 2, i.e., the time that at least one of the first and second intake valves 5a and 5b is open, is variable.

Each intake passage 7 is divided into first and second passages 7a and 7b between the surge tank 9 and the combustion chamber 2 by a partition wall 35, the first passage 7a communicating with the first intake port 3a and the second passage 7b communicating with the second intake port 3b. A shutter valve 36 is disposed in each second passage 7b to selectively open and close the second passage 7b. That is, the total effective cross-sectional area of the intake passage 7 for each combustion chamber 2 can be changed by opening and closing the shutter valve 36. Further, the effective length of the first and second passages 7a and 7b is changed by the same mechanism as that described above in conjunction with the embodiment shown in FIGS. 1 and 2.

The partition wall 35 is partially cut away to communicate the first and second passages 7a and 7b with each other at a part downstream of the shutter valve 36. A single fuel injection nozzle 10 is disposed in the cutaway portion of the partition wall 35 to inject fuel into both the passages 7a and 7b. If desired, the first and second passages 7a and 7b may be formed completely discretely.

Said shutter valve 36 is opened at a preset engine speed (a preset amount of intake air) in an intermediate engine speed region. That is, in the lower engine speed region lower than the preset engine speed, intake air is introduced into the combustion chamber 2 only through the first passage 7a, and accordingly the effective cross-sectional area of the intake passage is small. On the other hand, in the higher engine speed region higher than the preset engine speed, intake air is introduced into the combustion chamber 2 through both the first and second passages 7a and 7b, and accordingly the effective cross-sectional area of the intake passage is widened.

Figure 8:
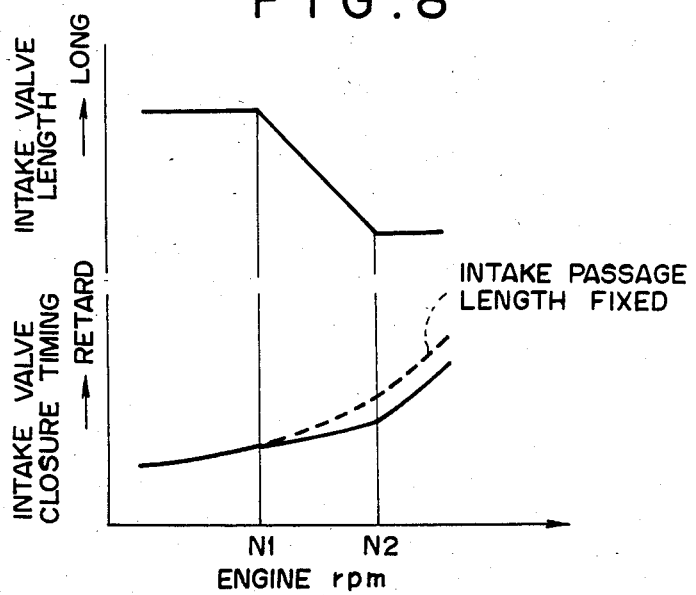
FIG. 8 is a view for illustrating control of the effective length of each intake passage and of the intake valve closure timing with respect to each other accomplished in the intake device.

An example of the manner of control of the effective length of the intake passages and of the intake valve closure timing is shown in FIG. 8.

When the engine speed is in an intermediate speed region between a first preset engine speed N1 and a second preset engine speed N2, the effective length of the intake passages is shortened as the engine speed increases so that the frequency of the air-column vibration is tuned with the engine speed to make better use of the intake inertia effect, thereby improving the engine output.

The second intake valve 5b is closed relatively early in the low speed region lower than the first preset engine speed N1 in order to prevent blow-back of intake gas. The closure timing of the second intake valve 5b is gradually retarded as the engine speed increases, and in the intermediate speed region between the first and second preset engine speeds N1 and N2 in which the effective length of the intake passage is changed, the closure timing of the second intake valve 5b is retarded so that a maximum intake inertia effect can be obtained taking into account said tuning effect. In the high speed region higher than the second preset engine speed N2, the closure timing of the second intake valve 5b is retarded so that the frequency of the air-column vibration and the engine speed are tuned with each other in response to change in the valve opening time. That is, in this embodiment, by changing the timing of one of the first and second intake valves 5a and 5b, the time that at least one intake valve opens can be changed, thereby enlarging the operating region of the engine over which said tuning effect can be obtained.

In the intake device of this embodiment, the combustion performance can be improved by reducing the effective cross-sectional area of the intake passage to increase the flow speed of intake gas in the low speed region, while in the high speed region, a large amount of air can be smoothly introduced into the combustion chamber by enlarging the effective cross-sectional area of the intake passage.

Further, since the supercharging utilizing the inertia effect described above is required only during heavy load operation of the engine, said control of the effective length of the intake passage and the intake valve closure timing may be accomplished only during heavy load operation of the engine.

Further, the above embodiments which are arranged to change the effective length of the intake passages by rotating the surge tank 9 are advantageous in that the overall structure can be simplified and made compact, and at the same time, the effective length of the intake passages can be reliably controlled. Though in the above embodiments, the effective length of the intake passages and the valve timing are controlled by way of the control units, they may be controlled using other various mechanisms. For example, an actuator driven in response to exhaust pressure may be used.

We claim:

1. An intake device for an internal combustion engine having an intake passage-length change means which is actuated to shorten the effective length of each intake passage as the engine speed increases so that the engine speed and the frequency of the air-column vibration in the intake passage are tuned with each other to obtain intake inertia effect, wherein the improvement comprises valve timing change means for changing at least the closure timing of each intake valve and control means for controlling the intake passage-length change means and the valve timing change means in response to each other according to the operating condition of the engine.

2. An intake device as defined in claim 1 in which said valve timing change means is controlled according to change in the effective length of the intake passage provided by the intake passage-length change means.

3. An intake device as defined in claim 2 in which said intake passage-length change means is controlled to change the effective length of the intake passage so that the effective length of the same is shorter when the engine speed is high than when the engine speed is low.

4. An intake device as defined in claim 3 in which said intake passage-length change means is adapted to change the effective length of the intake passage continuously according to the engine speed.

5. An intake device as defined in claim 3 in which said valve timing change means retards the closure timing of the intake valve as the effective length of the intake passage is shortened.

6. An intake device as defined in claim 1 in which said intake passage-length change means is actuated in a predetermined operating region of the engine and said valve timing change means is actuated at least in the operating region outside the predetermined operating region of the engine.

7. An intake device as defined in claim 6 in which said valve timing change means retards the closure timing of the intake valve as the engine speed increases in the operating region outside the predetermined operating region.

8. An intake device as defined in claim 6 in which said predetermined operating region is a region in which the engine speed is higher than a preset engine speed.

9. An intake device as defined in claim 8 in which said control means controls the intake passage-length change means and the valve timing change means so that the effective length of the intake passage is shortened and the closure timing of the intake valve is retarded as the engine speed increases in said predetermined operating region, and in the operating region outside the predetermined operating region, the closure timing of the intake valve is retarded as the engine speed increases.

10. An intake device as defined in claim 7 in which said predetermined operating region lies in a higher engine speed area than the other operating region.

11. An intake device as defined in claim 5 in which said closure timing of the intake valve is a timing at which the pressure in the intake port immediately upstream of the intake valve and the pressure in the combustion chamber substantially coincide with each other.

12. An intake device for an internal combustion engine having at least one cylinder, a variable length intake passage subject to air-column vibration associated with each cylinder, and a variable valve timing intake valve associated with each cylinder connecting said cylinder and said variable length intake passage, said intake device comprising:

intake passage length changing means for changing the effective length of each intake passage;

valve timing changing means for changing at least the closure timing of each intake valve; and control means for controlling the intake passage length changing means and the valve timing changing means relative to one another so that the closure timing of the intake valve occurs when the pressure produced by said air-column vibration in said intake passage immediately adjacent said intake valve is substantially equal to the pressure within said cylinder.

13. An intake device as defined in claim 12, in which said valve timing changing means is controlled in response to the change in the effective length of the intake passage provided by the intake passage length changing means.

14. An intake device as defined in claim 13, in which said intake passage length changing means is controlled in response to engine speed so that when the engine speed increases, the effective length of the intake passage decreases, and when the engine speed decreases, the effective length of the intake passage increased.

15. An intake device as defined in claim 12, in which said control means actuates said intake passage length changing means in a first predetermined operating region of said engine and actuates said valve timing changing means at least in a second operating region outside said first operation region.

16. An intake device as defined in claim 15, wherein said first predetermined operating region is a region in which the engine speed is higher than a predetermined valve.

17. An intake device as defined in claim 15, wherein said first predetermined operating region is a region in which the engine speed is higher than a first predetermined value and lower than a second predetermined value, said second predetermined value being larger than said first predetermined value.

* * * * *